United States Patent [19]
Yanidis et al.

[11] Patent Number: 5,382,472
[45] Date of Patent: Jan. 17, 1995

[54] RESEALABLE PACKAGING MATERIAL

[75] Inventors: Apostol Yanidis, Cincinnati, Ohio; Bruce Sanderford, Danville, Calif.

[73] Assignee: James River Paper Company, Inc., Milford, Ohio

[21] Appl. No.: 952,275

[22] Filed: Sep. 28, 1992

Related U.S. Application Data

[63] Continuation-in-part of Ser. No. 706,475, May 28, 1991, abandoned.

[51] Int. Cl.⁶ .................. B32B 27/08; B32B 7/12
[52] U.S. Cl. ...................... 428/349; 428/347; 428/194; 428/516; 428/517
[58] Field of Search ............... 428/349, 516, 192, 193, 428/194, 347, 517

[56]  References Cited

U.S. PATENT DOCUMENTS

| | | | |
|---|---|---|---|
| 3,355,319 | 11/1967 | Rees | 428/349 |
| 4,247,584 | 1/1981 | Widiger et al. | 428/194 X |
| 4,285,105 | 8/1981 | Kirkpatrick | 24/588 |
| 4,615,926 | 10/1986 | Hsu et al. | 428/35.2 |
| 4,673,601 | 6/1987 | Lamping et al. | 428/35.7 |
| 4,810,541 | 3/1989 | Newman et al. | 428/192 X |
| 4,861,632 | 8/1989 | Caggiano | 428/131 X |
| 4,876,125 | 10/1989 | Akao | 428/194 X |
| 5,089,320 | 2/1992 | Straus et al. | 428/216 |

FOREIGN PATENT DOCUMENTS

WO90/0742  7/1990  WIPO.

*Primary Examiner*—Daniel R. Zirker
*Attorney, Agent, or Firm*—Stanley M. Teigland

[57]  ABSTRACT

The invention is a flexible packaging material having a narrow band of pressure sensitive adhesive beneath a heatsealable surface layer. When the material is formed into a package, a heatseal is formed along the band of pressure sensitive adhesive. When the heatseal is opened, the pressure sensitive adhesive becomes exposed at the surface of the seal, which enables the package to be resealed by manual pressure alone. A particular advantage of the invention is that the pressure sensitive adhesive is present only in the narrow band, where it is needed to form the resealable seal. The packaging material is made by side-by-side coextrusion.

15 Claims, 4 Drawing Sheets

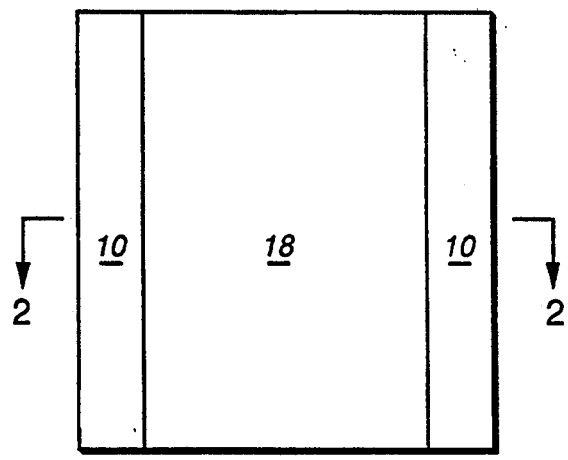
FIG._1
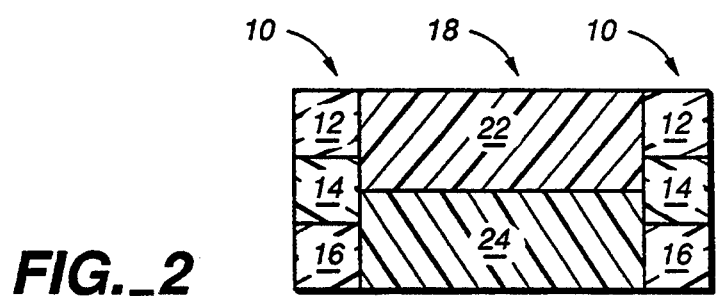
FIG._2
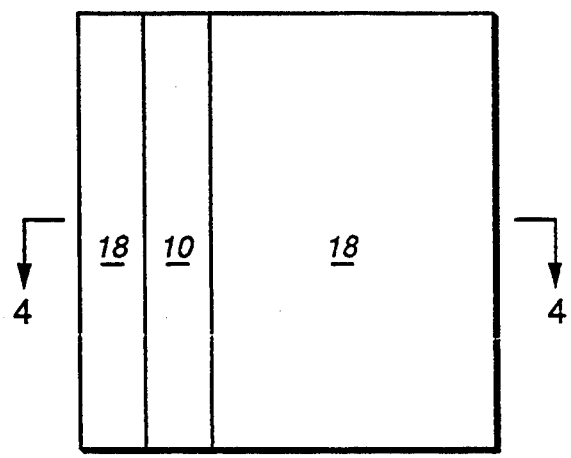
FIG._3
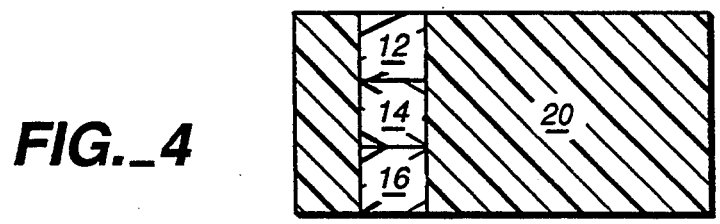
FIG._4

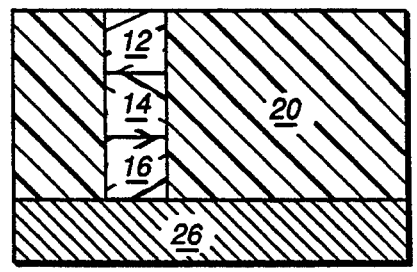
FIG._5
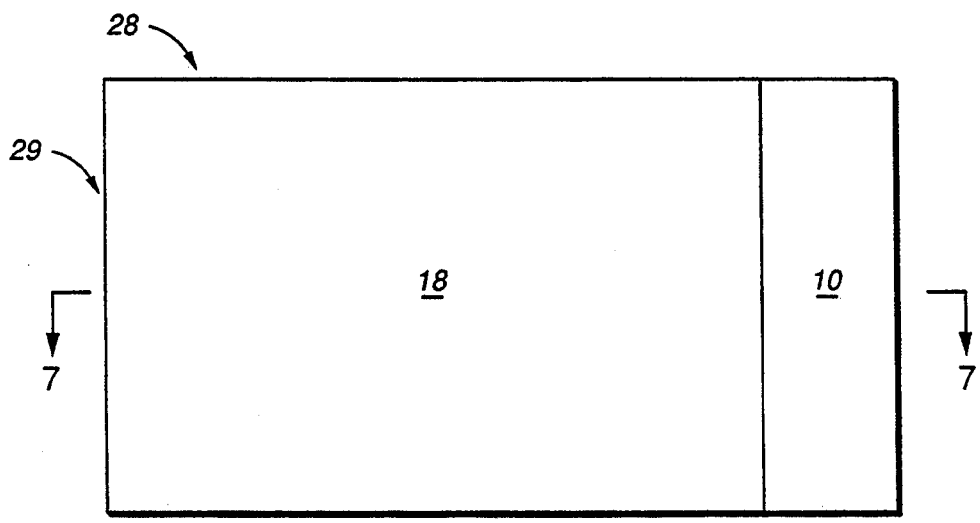
FIG._6
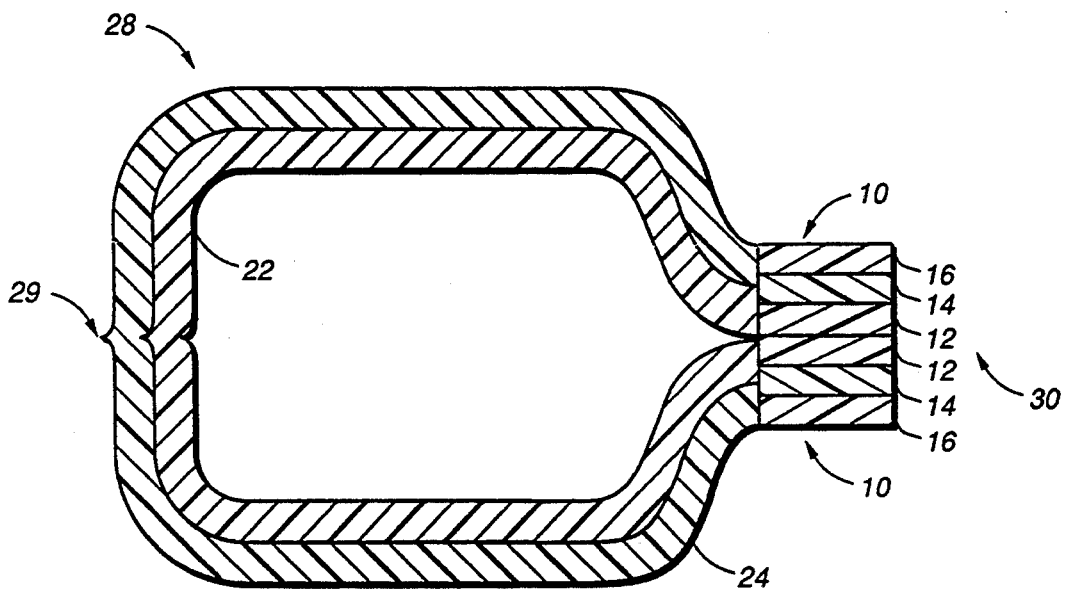
FIG._7

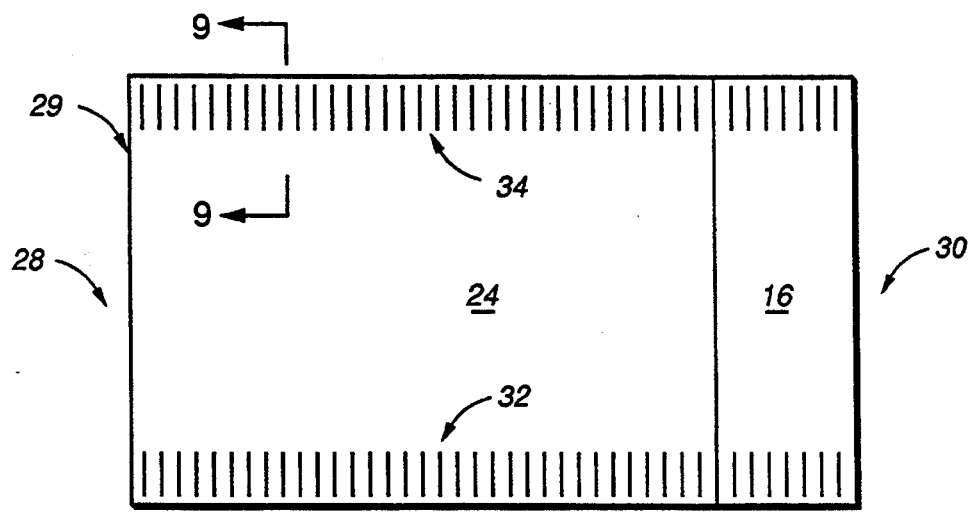
FIG._8
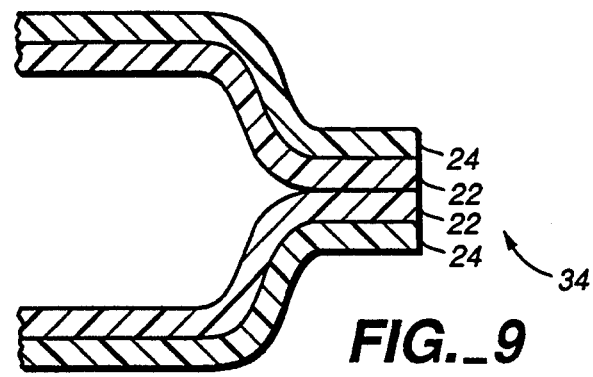
FIG._9
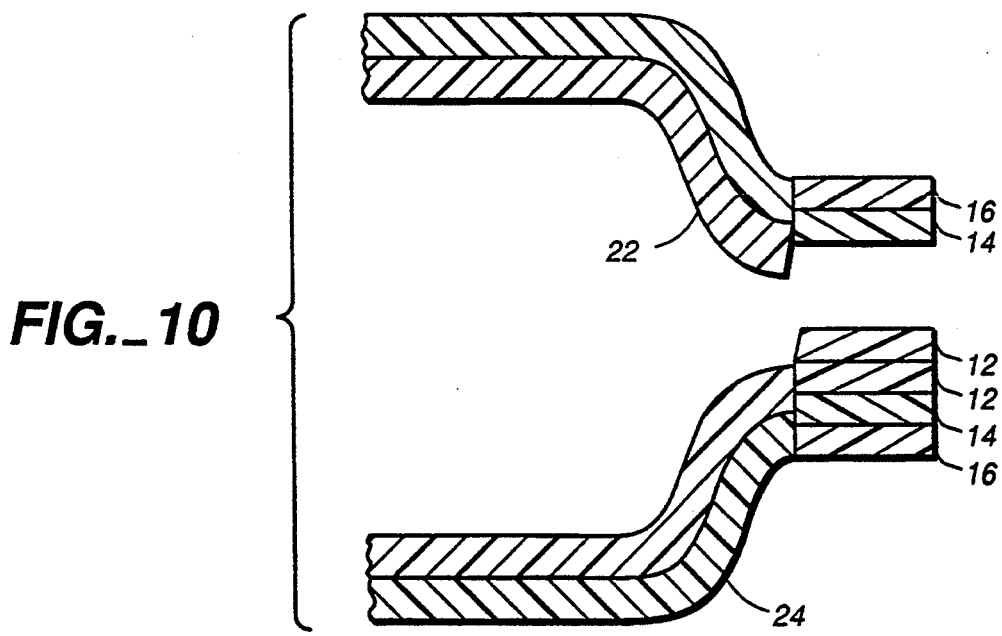
FIG._10

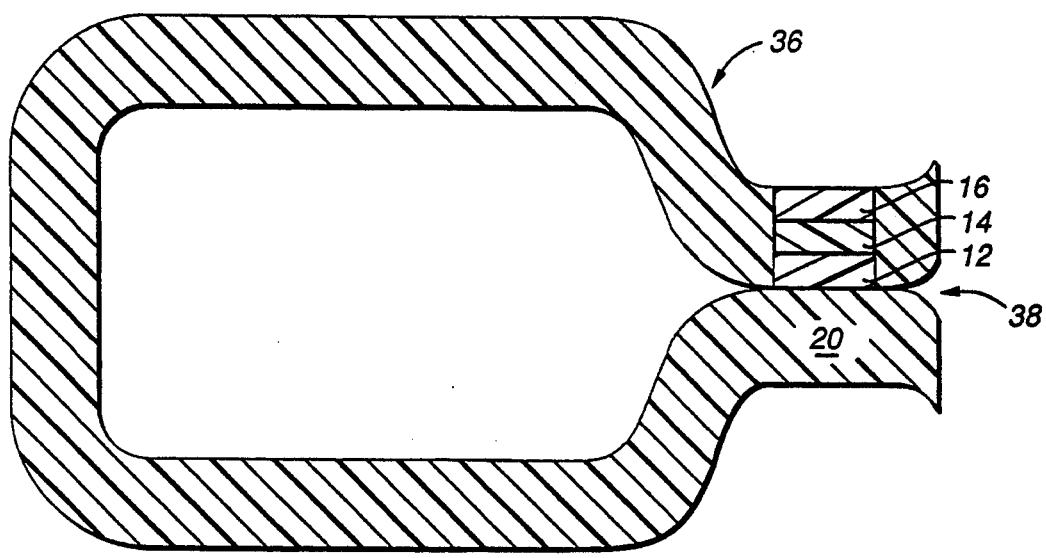
FIG._11
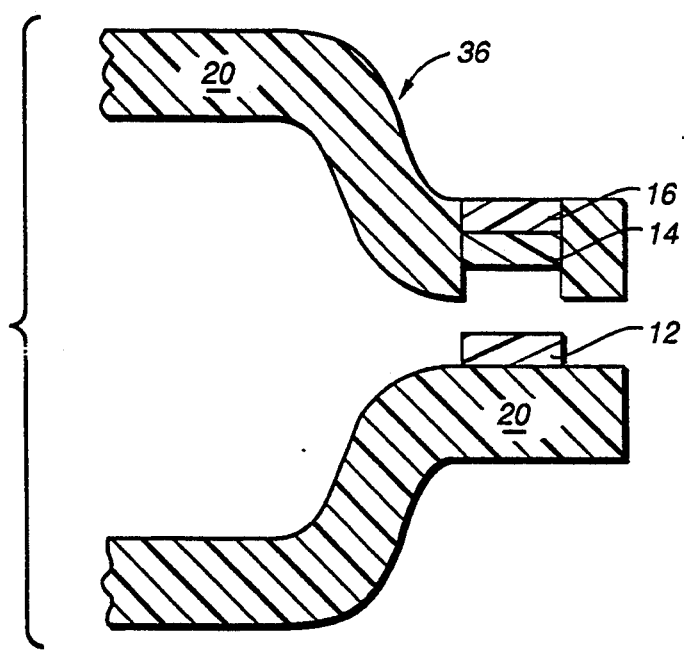
FIG._12

RESEALABLE PACKAGING MATERIAL

This is a continuation-in-part of application Ser. No. 706,475, filed May 28, 1991, now abandoned.

This invention is a resealable flexible packaging material made by side-by-side coextrusion of several thermoplastic resins.

U.S. Pat. No. 5,089,320 discloses a resealable packaging material having a layer of pressure sensitive adhesive sandwiched between a surface layer of a heatsealable polymer and a substrate layer. The material is capable of being heatsealed by the sealing jaws of a packaging machine to form a package having a seal which has an initial bond strength such that the package remains closed during normal handling but which can be readily pulled apart manually to open the package. When the seal is pulled apart, the surface layer ruptures to expose the pressure sensitive adhesive at the surface of the seal area. As a result, the package can be resealed at the area of the seal by the application of manual pressure alone.

A disadvantage of the packaging material disclosed in U.S. Pat. No. 5,089,320 is that the pressure sensitive adhesive is distributed throughout the entire material while it is required only at one margin of the material. Hence, most of the pressure sensitive adhesive is wasted. This invention provides a resealable packaging material of the type disclosed in U.S. Pat. No. 5,089,320, which is incorporated herein by reference, with the improvement that the pressure sensitive adhesive is distributed in the material only where it is needed.

The packaging material of this invention is made by side-by-side coextrusion of several thermoplastic resins, including the pressure sensitive adhesive. In side-by-side coextrusion, two or more streams of thermoplastic material are coextruded simultaneously through a die to form a film having two or more bands of material extending in the machine direction (longitudinal axis of the film). The die may be a slotted die for making cast film, as shown in U.S. Pat. No. 4,731,004, or it may be an annular die for making blown film, as shown in U.S. Pat. No. 3,837,773. In this invention, one of the bands (first band) contains conventional polymers used in making plastic packaging film and no pressure sensitive adhesive, and at least one of the other bands (second band) includes a surface layer of a heatsealable polymer, a core layer of pressure sensitive adhesive adjacent the layer of heatsealable polymer, and a layer of thermoplastic resin adjacent the layer of pressure sensitive adhesive. The packaging material is capable of being heatsealed by the sealing jaws of a packaging machine acting on the heatsealable polymer in the second band to form a package. The heatseal has an initial bond strength such that the package remains closed during normal handling but the heatseal can be readily pulled apart manually to open the package. When the heatseal is pulled apart, the heatseal layer ruptures through to the layer of pressure sensitive adhesive and delaminates to expose the pressure sensitive adhesive at the surface of the heatseal area. As a result, the packaging material may be resealed at the area of the seal by the application of manual pressure alone to reclose the package. The advantage of this invention is that the pressure sensitive adhesive is distributed in the packaging material in the second band, where it is needed to form the resealable seal, and not in the first band, where it is not needed.

BRIEF DESCRIPTION OF THE DRAWINGS

FIG. 1 is a top view of a rectangular section of a side-by-side coextruded film of this invention.

FIG. 2 is a cross section of the film of FIG. 1 taken along line 2—2.

FIG. 3 is a top view of a rectangular section of another side-by-side coextruded film of this invention.

FIG. 4 is a cross section of the film of FIG. 3 taken along line 4—4.

FIG. 5 is a cross section of a packaging material of this invention made by extrusion coating a substrate with the film of FIG. 3.

FIG. 6 is a top view of the film of FIG. 1 folded over and heatsealed to itself to form a tube.

FIG. 7 is a cross section of the tube of FIG. 6 taken along line 7—7.

FIG. 8 is a top view of the tube of FIG. 6 after the tube has been heatsealed at both ends to form a package.

FIG. 9 is a partial cross section of the package of FIG. 8 taken along line 9—9.

FIG. 10 is the cross section of FIG. 7, shown partially, after the package of FIG. 8 has been opened.

FIG. 11 is a cross section of the film of FIG. 3 formed into a package.

FIG. 12 is the package of FIG. 11, shown partially, after the package has been opened.

Referring to FIGS. 1-5, the film of this invention is a side-by-side coextruded film comprising one or more bands 10 of a surface layer of a heatsealable polymer 12, a layer of pressure sensitive adhesive 14 adjacent the layer of heatsealable polymer 12, and a layer of a thermoplastic polymer 16. The film also comprises one or more bands 18 of thermoplastic polymer. Each band 18 may comprise a single layer of polymer 20 as shown in FIGS. 4 and 5, or two or more layers of dissimilar polymers 22,24, as shown in FIG. 2. The polymer or polymers forming each band 18 are conventional polymers used in producing packaging films and do not include pressure sensitive adhesive. In the embodiment shown in FIG. 2, the polymer forming layer 22 is preferably a heatsealable polymer and is preferably the same as the heatsealable polymer forming layers 12. Similarly, the polymer forming layer 24 is preferably the same as the polymer forming layers 16 and is preferably a polyolefin, such as high density polyethylene. In the embodiment shown in FIG. 4, the polymer forming layer 20 is preferably the same as the polymer forming layer 16, and is preferably a polyolefin, such as low density polyethylene. In fact, the layers 16, 20 may be formed from a single polymer stream entering the die used to form the film. The same is true for layers 12 and 22 and for layers 16 and 24. Each band extends from one surface of the coextruded film to the other surface even though a layer of the band might be formed from a polymer stream that also forms a layer of another band.

Referring to FIG. 5, the side-by-side coextrusion may be extrusion coated onto a substrate 26, which may be paper, metal foil, or another plastic film, such as polypropylene, nylon or polyester, which may be oriented or metallized. The layer 20 adjacent the substrate is preferably formed from a polymer that adheres well to the substrate, such as an ethylene-vinyl acetate copolymer.

The side-by-side coextrusion, whether extrusion coated onto a substrate or extruded as a free film, may contain additional layers if desired, such as layers that provide desired barrier to transmission of oxygen, water vapor, aroma and the like.

Referring to FIGS. 6–8, the film of FIG. 1 may be folded over and heatsealed to itself to form a tube 28. The tube 28 has front and rear panels that overlie one another and have a common fold line 29 that is opposite the bands 10. The tube may conveniently be made on a vertical form, fill and seal packaging machine that is provided with a continuous length (i.e. roll) of the packaging material of this invention. The machine makes the tube 28 by bringing the side margins of the material together and heatsealing the side margins together to form the longitudinal seal 30. The tube is heatsealed transversely to form a pouch having a first side defined by the transverse heatseal 32, a second side defined by the longitudinal heatseal 30, and a third side defined by the fold line 29 opposite the longitudinal heatseal. The pouch is then filled with product (not shown), such as cereal or snack food, before the tube is heatsealed transversely to form heatseal 34, which forms the package and encloses the product. The heatseals 32, 34 normally form the bottom and top, respectively, of packages formed on conventional vertical form, fill and seal machines, but in the embodiment shown in FIG. 8 the heatseals 32, 34 form the sides of the package and the heatseal 30 forms the top of the package. (In this respect the term "top" refers to the edge of the package through which the product is normally removed.) Since in conventional vertical form, fill and seal machines the longitudinal seal (corresponding to heatseal 30) is formed in the center of the rear panel of the package, rather than at the edge of the front and rear panels as shown in FIG. 8, a modification to such machines would be necessary to form the embodiment shown in FIG. 8, but the modification would be within the skill of one skilled in the art of packaging machines. The longitudinal heatseal 30 is shown as a fin seal but it could be a lap seal.

The package shown in FIG. 8 is opened by pulling apart the longitudinal seal 30. As shown in FIG. 10, when the seal 30 is opened, the heatseal layer 12 ruptures through to the adhesive layer 14 and delaminates from the adhesive layer 14, thereby exposing the pressure sensitive adhesive at the surface of the seal area. The adhesive enables the package to be resealed and opened many times using manual pressure alone.

FIG. 11 shows the film of FIG. 3 formed into a bag 36 by folding the film over on itself and heatsealing the bag along band 10 to form heatseal 38 at the mouth of the bag. The side seams of the bag (not shown) may be formed by side welding the film, with gussets if desired. Such a bag may conveniently be made on a horizontal form, fill and seal packaging machine, which also fills the bag with product, such as bread or other baked goods. FIG. 12 shows the heatseal 38 after the bag has been opened.

The band 10 containing the pressure sensitive adhesive is preferably located at one or both margins of the packaging material, as shown in the drawings, and preferably has a width ranging from about 1 to 10 centimeters. The band 10 also preferably contains a colorant to identify the location of the band. The colorant is preferably present in the heatsealable polymer. In certain preferred embodiments, the band 10 is located at both margins, as shown in FIG. 1, and each band contains a different colorant such that when the two bands are sealed together, the presence of the seal is indicated by a distinctive color formed by the combination of the two colorants. For example, one colorant can be blue and the other yellow, which form a green color when the bands are sealed together. A related concept is disclosed in U.S. Pat. No. 4,285,105.

The pressure sensitive adhesive employed in this invention is preferably a blend of a thermoplastic elastomer and a tackifier. The blend preferably comprises from about 40 to 80 percent of the thermoplastic elastomer, 20 to 60 percent of the tackifier, and up to about 15 percent of other components, such as a fragrance and conventional additives, such as an antioxidant and an oil.

Particularly suitable elastomers include styrene copolymers, such as styrene-butadiene copolymers sold under the trademark Stereon by Firestone and styrene-isoprene copolymers sold under the trademark Kraton by Shell Chemical Company. Other suitable elastomers include polyurethane and ethylene-vinyl acetate copolymers having a vinyl acetate content of about 18 percent or higher.

The tackifier may be any tackifier conventionally used with elastomers to form pressure sensitive adhesives. Suitable tackifiers include terpene resins, such as resins sold under the trademark Zonatac by Arizona Chemical Company, and petroleum hydrocarbon resins, such as resins sold under the trademark Escorez by Exxon Chemical Company.

The pressure sensitive adhesive is coextrudable with the other resins forming the side-by-side coextrusion. The coextrudability of the pressure sensitive adhesive may be enhanced by utilizing a thermoplastic elastomer having a low melt index and by increasing the proportion of the elastomer in the adhesive. The melt index of the adhesive is preferably less than 30, more preferably less than 10, for coextrusion with conventional polyolefins.

The thickness of the layer of pressure sensitive adhesive is preferably between about 0.1 and 2.0 mil (2.5 and 51 microns), more preferably between about 0.3 and 0.7 mil (7.6 and 18 microns).

The pressure sensitive adhesive becomes exposed at the surface of the packaging material when the heatseal formed by the adjacent heatseal layer is pulled apart. The heatseal layer ruptures through to the adhesive layer and then delaminates until the end of the seal is reached. The delamination may occur between the heatseal layer and the adhesive layer, between the adhesive layer and the substrate layer, or, preferably, in a plane lying in the adhesive layer so the adhesive is present on both surfaces of the seal area after the seal has been pulled apart. The latter type of delamination is promoted by heating both sealing jaws when the heatseal is formed.

The heatseal layer may be a layer of a thermoplastic film-forming polymer which is conventionally used as a heat seal layer in packaging materials. The polymer preferably has a tensile strength such that at the desired thickness of the surface layer the heatseal is easy to open, preferably by a force between about 0.4 and 0.9 kg/cm. The polymer also preferably has a low elongation at break, preferably less than 400 percent. The polymer is preferably a copolymer of ethylene and an ethylenically unsaturated comonomer selected from the group consisting of carboxylic acids and esters, salts and anhydrides thereof. Examples of such comonomers include acrylic acid, methacrylic acid, methyl acrylate, ethyl acrylate, methyl methacrylate, vinyl acetate, and maleic anhydride. Such copolymers are well known commercially available polymers commonly used to form heatseal layers in flexible packaging materials. Other polymers, such as polyolefins, may be blended with the copolymer in a minor amount. The copolymer is preferably an ionomer. The term ionomer refers to a film-forming copolymer of an olefin and an ethylenically unsaturated monocarboxylic acid wherein at least 10% of the carboxylic acid groups are neutralized by a metal ion, preferably zinc. The olefin has the formula $RCH=CH_2$ where R is hydrogen or an alkyl group having up to 8 carbon atoms. The olefin is preferably ethylene. The carboxylic acid is preferably acrylic acid, methacrylic acid, or methylmethacrylic acid. The proportion of olefin units in the ionomer is at least 50, preferably at least 80, mole percent. Suitable ionomers are described in U.S. Pat. No. 3,355,319 and are available commercially under the trademark Surlyn.

The heatseal layer is preferably relatively thin, preferably thinner than the heatseal layer of conventional packaging materials so the layer ruptures when the seal is pulled apart. The thickness of the heatseal layer is preferably between about 0.05 and 0.5 mil (1.3 and 13 microns), more preferably between about 0.075 and 0.2 mil (1.9 and 5 microns).

The packaging material may be sealed in accordance with methods typically used for sealing flexible packaging materials in packaging machines. The heatseal layer is preferably heatsealed at a conventional temperature of about 230° F. (110° C.). The seal has a bond strength that is sufficient to ensure the package does not open during normal handling. This bond strength is preferably at least about two pounds per inch (0.4 kg/cm). However, the seal is also preferably easy to open by being pulled apart manually, so the bond strength is preferably less than about five pounds per inch (0.9 kg/cm).

Until the heatseal layer is ruptured, the coefficient of friction of the packaging material is determined by the substances forming the surfaces of the material. The coefficient of friction is preferably such that the material of this invention may be used in conventional packaging machines, such as form, fill and seal machines, in the same manner as conventional flexible packaging materials. In preferred embodiments, each surface of the material has a coefficient of friction against stainless steel which is within the preferred range for machinability, which is from about 0.1 to 0.5.

We claim:

1. A flexible packaging material comprising a side-by-side coextruded film having a first band comprising a first thermoplastic resin and a second band comprising a surface layer of a heatsealable polymer, a layer of pressure sensitive adhesive adjacent the surface layer of heatsealable polymer, and a layer of a second thermoplastic resin adjacent the layer of pressure sensitive adhesive, whereby the layer of pressure sensitive adhesive forms a core layer between the surface layer of the heatseal polymer and the layer of the second thermoplastic resin in the second band, the film being capable of being heatsealed to itself by the sealing jaws of a packaging machine acting on the band of heatsealable polymer to form a package having a heatseal which has an initial bond strength such that the package remains closed during normal handling but which can be readily pulled apart manually to open the package, the heatseal layer being ruptured when the heatseal is pulled apart such that the pressure sensitive adhesive is exposed at the surface of the heatseal area, whereby the film may be resealed to itself at the area of the seal by the application of manual pressure alone to reclose the package, the pressure sensitive adhesive being distributed in the packaging material only in the second band to form the resealable seal, and not in the first band.

2. The packaging material of claim 1 wherein the second band is at a margin of the packaging material.

3. The packaging material of claim 1 wherein the second band has a width between about one centimeter and ten centimeters.

4. The packaging material of claim 1 wherein the film is coextruded onto a flexible substrate.

5. The packaging material of claim 4 wherein the substrate is selected from the group consisting of paper, metal foil, polyester film, polypropylene film, and nylon film.

6. The packaging material of claim 1 wherein the second band contains a colorant.

7. The packaging material of claim 1 having two second bands, each second band comprising a surface layer of heatsealable polymer, a layer of pressure sensitive adhesive adjacent the surface layer of heatsealable polymer, and a layer of a second thermoplastic resin adjacent the layer of pressure sensitive adhesive, each second band further containing a different colorant from the other, such that when the two bands are sealed to each other, the presence of the seal is indicated by a distinctive color formed by the combination of the two colorants.

8. The packaging material of claim 1 wherein the heatsealable polymer is an ionomer.

9. The packaging material of claim 1 wherein the pressure sensitive adhesive comprises from about 40 to 80 percent of a thermoplastic elastomer and from about 20 to 60 percent of a tackifier.

10. The packaging material of claim 1 wherein the first band comprises a surface layer of a heatsealable polymer and an adjacent layer of a polyolefin.

11. The packaging material of claim 10 wherein the heatsealable polymer in the first band is the same as the heatsealable polymer in the second band.

12. The packaging material of claim 11 wherein the second thermoplastic resin in the second band is a polyolefin that is the same as the polyolefin in the first band.

13. The packaging material of claim 1 wherein the first thermoplastic resin is the same as the second thermoplastic resin.

14. The packaging material of claim 13 wherein the thermoplastic resin is a polyolefin.

15. The packaging material of claim 1 wherein the initial bond strength is from about two pounds per inch to about five pounds per inch.

* * * * *